(12) United States Patent
St-Germain et al.

(10) Patent No.: US 9,907,427 B2
(45) Date of Patent: Mar. 6, 2018

(54) SYSTEM AND METHOD FOR MAKING A BEVERAGE

(71) Applicant: Keurig Canada Inc., Saint John (CA)

(72) Inventors: Marc St-Germain, Boucherville (CA);
Stephen Grant, Boucherville (CA);
Marc-Andre Vaillant, LaSalle (CA);
Alain Boily, Carignan (CA); Jorge Barbales, Brossard (CA)

(73) Assignee: Keurig Canada Inc., Saint John (CA)

( * ) Notice: Subject to any disclaimer, the term of this patent is extended or adjusted under 35 U.S.C. 154(b) by 249 days.

(21) Appl. No.: 14/580,617

(22) Filed: Dec. 23, 2014

(65) Prior Publication Data

US 2015/0107459 A1 Apr. 23, 2015

Related U.S. Application Data (62) Division of application No. 13/828,431, filed on Mar. 14, 2013, now abandoned.

(Continued)

(51) Int. Cl.
*A47J 31/36* (2006.01)
*A23F 5/26* (2006.01)
(Continued)

(52) U.S. Cl.
CPC .............. *A47J 31/36* (2013.01); *A23F 5/262* (2013.01); *A47J 31/18* (2013.01); *A47J 31/60* (2013.01)

(58) Field of Classification Search
CPC ..................................................... A47J 31/36
See application file for complete search history.

(56) References Cited

U.S. PATENT DOCUMENTS 2,654,505 A * 10/1953 Fuhrman ............... A47J 31/40
222/135
3,369,478 A 2/1968 Black
(Continued)

FOREIGN PATENT DOCUMENTS

CN 200957018 10/2007
CN 201260608 Y 6/2009
(Continued)

OTHER PUBLICATIONS

International Search Report dated Feb. 21, 2014 from corresponding PCT Application No. PCT/CA2013/050962.
(Continued)

*Primary Examiner* — Tu B Hoang
*Assistant Examiner* — Erin McGrath
(74) *Attorney, Agent, or Firm* — Wolf, Greenfield & Sacks, P.C.

(57) ABSTRACT

A system and a method for making a beverage from a mixture of liquid and solid particles are disclosed. The liquid and solid particles are introduced into a chamber so as to allow the liquid to infuse with the flavor or quality of the solid particles. A piston having an integrated filter is in sealed contact with the chamber, and can be vertically displaced within the chamber. When the piston is displaced downward, air is forced from below the filter and into the mixture sitting above the filter, agitating the mixture. When the piston is displaced upward, the mixture is drawn from above the filter. This separates the spent solid particles from the infused liquid, which collects in the chamber, thereby making the beverage. Also described are a driving mechanism for displacing the piston, a dispensing mechanism for releasing the beverage, and a wiping mechanism for wiping spent solid particles.

8 Claims, 8 Drawing Sheets

Related U.S. Application Data (60) Provisional application No. 61/737,324, filed on Dec. 14, 2012.

(51) Int. Cl.
*A47J 31/18* (2006.01)
*A47J 31/60* (2006.01)

(56) References Cited

U.S. PATENT DOCUMENTS

| | | |
|---|---|---|
| 3,565,641 A | 2/1971 | King |
| 4,833,979 A | 5/1989 | Garulli et al. |
| 4,903,586 A | 2/1990 | King |
| 5,197,372 A | 3/1993 | Schneeberger |
| 5,197,373 A | 3/1993 | De Jong |
| 5,351,604 A | 10/1994 | King et al. |
| 5,406,882 A | 4/1995 | Shaanan |
| 5,638,739 A | 6/1997 | Shaanan et al. |
| 5,722,313 A * | 3/1998 | Schmed .............. A47J 31/3614 99/289 R |
| 5,913,963 A | 6/1999 | King |
| 6,739,240 B2 | 5/2004 | De Koning et al. |
| 7,673,555 B2 | 3/2010 | Nosler et al. |
| 2005/0199129 A1 | 9/2005 | Glucksman et al. |
| 2006/0065128 A1 | 3/2006 | Lu |
| 2010/0034942 A1* | 2/2010 | Illy ....................... A47J 31/002 426/433 |
| 2010/0154645 A1 | 6/2010 | Nosler et al. |
| 2014/0360379 A1* | 12/2014 | Radhakrishnan ... A47J 31/3609 99/323 |

FOREIGN PATENT DOCUMENTS

| | | |
|---|---|---|
| EP | 0563499 | 3/1993 |
| JP | 61119141 | 6/1986 |

OTHER PUBLICATIONS

Supplementary European Search Report dated Aug. 16, 2016 from corresponding European Application No. 13862886.2.

\* cited by examiner

SYSTEM AND METHOD FOR MAKING A BEVERAGE

RELATED APPLICATIONS

This application is a divisional of U.S. application Ser. No. 13/828,431 filed on Mar. 14, 2013 and entitled "System and Method for Making a Beverage", which claims the benefit of U.S. Provisional Application No. 61/737,324, filed on Dec. 14, 2012 and entitled "System and Method for Making a Beverage". Each of the above-identified patent applications is incorporated herein by reference in its entirety.

FIELD OF THE INVENTION

The present invention relates to a system and method for making a beverage. More particularly, the present invention relates to a system and method for making, and in some cases dispensing, a beverage from a mixture of liquid and infusible solid particles.

BACKGROUND

Systems and methods for making beverages are known in the art.

One known system and method is described in U.S. Pat. No. 5,406,882 naming SHAANAN as inventor. A brewer for providing a single cup of coffee is described, and the brewer includes an outer tubular member. A slidable second tubular member reciprocates within the first tubular member along an axis and is in sealing contact with the inner surface of the first tubular member. A fixed piston head is located within the second tubular member and is fixed relative to the first tubular member. A wiper and a pour spout are also described.

U.S. Pat. No. 5,351,604 to KING et al. describes a coffee brewer method and apparatus. The apparatus consists of a lower and an upper chamber which move relative to one another. The upper chamber allows the mixing of the coffee and water. The lower chamber has a filter element at the top which allows the coffee liquid to move from the upper chamber to the lower chamber. A piston moves within the chamber so as to mix the water and coffee and so as to release them from the apparatus.

Other patent documents in this field that are known to the Applicant include: U.S. Pat. No. 3,565,641; U.S. Pat. No. 4,833,979; U.S. Pat. No. 4,903,586; U.S. Pat. No. 5,197,372; U.S. Pat. No. 5,197,373; U.S. Pat. No. 5,913,963; U.S. Pat. No. 6,739,240; U.S. Pat. No. 7,673,555; US 2006/0065128 A1; JP 61119141 A; EP 0564399 A2; and CN 200957018 Y.

Also known are certain disadvantages associated with some of the above-mentioned systems and methods.

There therefore remains a need for systems and/or methods for making a beverage, which is an improvement over other related systems and/or methods known in the art.

SUMMARY

According to an aspect of the present invention, there is provided a brewer system for making and dispensing a beverage from a mixture of liquid and infusible solid particles.

The system first includes a chamber for receiving the liquid and the particles. The chamber is provided with an inner surface and an outlet for dispensing the beverage. A piston is provided in sealed contact with the inner surface and vertically displaceable within the chamber. The piston divides the chamber into an upper portion above the piston and a sealed lower portion below the piston. The piston includes a filter and is configured so that the mixture collects in the upper portion.

The system further includes a driving mechanism mountable to the piston and configured for displacing the piston within the chamber according to an infusion cycle. The infusion cycle includes displacing the piston downward within the chamber, thereby forcing air from the lower portion through the filter and into the upper portion so as to agitate the mixture, and subsequently displacing the piston upward within the chamber, thereby drawing the beverage from the upper portion through the filter and into the lower portion while spent solid particles remain above the filter.

The system also includes a dispensing mechanism mounted about the outlet of the chamber, the dispensing mechanism dispensing the beverage out of the brewer system.

According to another aspect of the present invention, there is provided a method for making a beverage from a mixture of liquid and infusible solid particles using a chamber having a piston in sealed contact therewith and vertically displaceable therein, the piston having a filter and dividing the chamber into an upper portion above the piston and a sealed lower portion below the piston. The method includes the following steps:

a) introducing the liquid and solid particles into the upper portion of the chamber;

b) displacing the piston downward within the chamber to force air from the lower portion through the filter and into the upper portion so as to agitate the mixture; and c) displacing the piston upward within the chamber to draw the beverage from the upper portion through the filter and into the lower portion while spent solid particles remain above the filter.

According to one embodiment, the spent solid particles are removed from above the filter at substantially the same time as when the piston reaches a top of the chamber. This removal can be accomplished with a wiping mechanism.

In some embodiments, the dispensing mechanism is disposed within the lower portion of the chamber, and is triggered when the piston reaches a triggering height within the chamber. The dispensing mechanism can include a spout in fluid communication with the outlet of the chamber, and a plug which prevents the beverage from entering the spout.

In some embodiments, the piston, filter, and chamber can be cleaned by introducing a cleaning fluid and displacing the piston within the chamber.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF EMBODIMENTS

In the following description, the same numerical references refer to similar elements. Furthermore, for sake of simplicity and clarity, namely so as to not unduly burden the figures with several reference numbers, not all figures contain references to all the components and features of the illustrated embodiments and references to some components and features may be found in only one figure, and components and features illustrated in other figures can be easily inferred therefrom. The embodiments, geometrical configurations, materials mentioned and/or dimensions shown in the figures are optional, and are provided for exemplification purposes only.

In addition, although the embodiments illustrated in the accompanying drawings include various components and although the described embodiments of the system and method as shown consist of certain geometrical configurations as explained and illustrated herein, not all of these components and geometries are considered essential and thus should not be taken in their restrictive sense, i.e. should not be taken as to limit the scope of the system and method. It is to be understood that other suitable components and cooperations thereinbetween, as well as other suitable geometrical configurations may be used for the system and corresponding parts, as briefly explained herein, without departing from the scope of the invention.

The present description relates to a brewer system (sometimes referred to as simply "system") and a method for making a beverage from a mixture of liquid and infusible solid particles. The system and method can be used to make a beverage and to dispense it, such as into a user's cup, for example. The term "making" refers to the bringing about or creation of the beverage from the mixture of liquid and solid particles.

The liquid so mixed can be any suitable liquid used for making beverages. The most common example of such a liquid includes water, heated or not heated, which is used in most beverages fit for human consumption. In some instances, it may be desired to use liquids other than water, such as milk, cream, syrup, and juices. The expression "infusible solid particles" refers to any solid capable of being mixed with a liquid to create a solution. The solid particles can be of any size or shape provided that they are "infusible", which refers to their ability to at least partially dissolve and/or to impart a flavouring or quality to the liquid. Some examples of such infusible solid particles include coffee, tea, and chocolate. Consequently, the term "beverage" as used herein refers to the state of the mixture once the liquid has been suitably infused with the solid particles such that the mixture is ready to be consumed. Some examples of beverages that can be made according to the system and method include coffee, tea, hot chocolate, and juice. Different properties can also be imparted to such beverages by modifying some of the parameters of the system or method.

Figure 1:
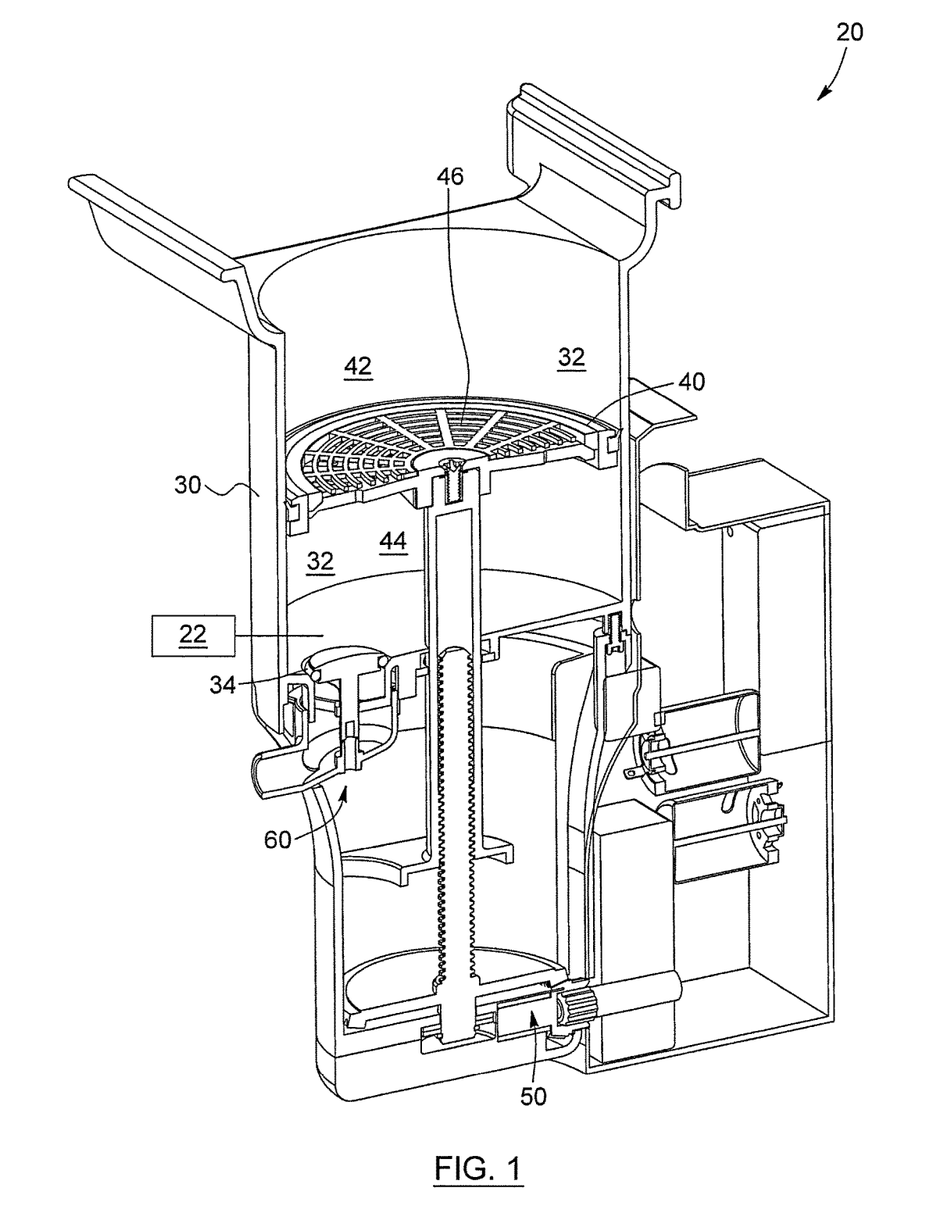
FIG. 1 is a perspective cut-away view of a brewer system, according to an embodiment of the present invention.

Referring to FIG. 1, and according to one embodiment of the invention, there is provided a brewer system 20 for making and dispensing a beverage from a mixture of liquid and infusible solid particles. The expression "brewer system" as used herein refers to a mechanism or assembly which allows for the making of a beverage through processes such as soaking, boiling, and mixing. Although not described in detail in the present disclosure, it is understood that some of the features of the system 20 can be supported by various support structures such as a support frame, housings, and other similar structures.

The brewer system 20 has a chamber 30 for receiving the liquid and the particles. The chamber 30 is the component of the system 20 which receives the mixture of liquid and solid particles, and which houses the mixture while it is being made into the beverage. The chamber 30 can therefore take any shape, or be of any appropriate dimension, provided that it can receive and hold a sufficient quantity of mixture for a desired application. The chamber 30 can thus be cylindrical, rectangular, triangular, or any other suitable shape. The chamber 30 can also be made of any suitable material. In some embodiments, the material of the chamber is preferably resistant the cyclical stresses associated with repeated infusion cycles, and can resist the pressure and temperature generated during these cycles, among other factors. As such, some examples of the materials that can be used for the chamber 30 include thermoplastics or other polymers, and metal alloys.

The chamber 30 has an inner surface 32, and an outlet 34. The outlet 34 may be embodied by any suitable aperture, release, duct, or other like structure from which the beverage or mixture can be dispensed.

The brewer system 20 also includes a piston 40 in sealed contact with the inner surface 32, and which is displaceable within the chamber 30. The piston 40 provides a barrier between portions of the chamber 30 such that liquids, solids, and gasses from one portion can only pass through the piston 40 to another portion of the chamber 30 under certain conditions. This barrier allows the piston 40 to push/pull liquids, solids, and gasses as required. The piston 40 can be any disc, cylinder, head, or other like device or assembly which abuts against the inner surface 32 and can move within the chamber 30 while keeping this contact. Indeed, the piston 40 is in "sealed contact" with the inner surface 32, which is understood to mean that the piston 40 fits closely within the inner surface 32 such that liquids, solids, or gas cannot substantially bypass the interface between the piston's 40 edges and the inner surface 32. One possible technique by which this sealed contact can be achieved is through the use of gaskets or other suitable seals mounted about the edge of the piston 40, these seals abutting against the inner surface 32. In order to facilitate the movement of the piston 40 while still maintaining the sealed contact of the piston 40 with the inner surface 32, the inner surface 32 may be made of a material, or have a material added to it, which reduces the friction caused by the sealed contact.

The piston 40 is vertically displaceable within the chamber 30, that is, it can move both upward and downward in the chamber 30, against the inner surface 32. The use of the terms "up" and "down" to describe the motion of the piston 40 may be used in a relative sense, meaning that the piston 40 can be displaced vertically within the fixed chamber 30, or alternatively, the chamber 30 can be moved vertically with respect to a fixed piston 40. Irrespective of such relative motion, the piston 40 divides the chamber 30 into both an upper portion 42 corresponding to the portion of the chamber 30 above the piston 40, and a lower portion 44 corresponding to the portion of the chamber 30 below the piston 40. One skilled in the art will readily understand that the relative dimensions of the upper and lower portions 42,44 change as the piston 40 is vertically displaced, since the upper and lower portions 42,44 are defined relative to the piston 40.

The piston 40 also has a filter 46. The filter 46 allows for the passage of liquid and gas from above and below the filter, while preventing the passage of some solids. As such, the filter 46 may be embodied by any suitable permeable device which can remove the solid particles from the mixture after sufficient infusion and which allows passage of the mixture therethrough, so as to form the beverage. The filter 46 can also allow the passage of gasses (i.e. air) between the upper and lower portions 42,44. In some configurations, the filter 46 can be sufficiently fine that liquid and gasses can only pass through under pressure. Some examples of suitable filters include polyester or stainless steel woven cloth, and etched metal sheet. Some examples of suitable filter materials include stainless steel, aluminum, polyester, nylon, or a combination thereof. To achieve these functions, the filter 46 can be positioned at any suitable location on the piston 40. One example of such a location is provided in FIG. 1, where the piston 40 is shown as a circular head, the filter 46 forming a circular area which is integral with the piston 40. In one possible embodiment, the filter 46 can be a filter assembly, which includes a filter frame onto which one or more very fine filtering components are mounted.

The piston 40 is configured to allow the mixture to collect in the upper portion 42 of the chamber 30. Once the liquid and solid particles are added into the chamber 30, they may contact the filter 46. The filter 46 can form a barrier which prevents them from passing into the lower portion 44, thus allowing the mixture to collect in the upper portion 42, and allowing the liquid to infuse with the quality or flavour of the solid particles. Advantageously, this can allow the mixture to infuse even before the piston 40 has been vertically displaced, thus reducing infusing times.

The brewer system 20 also has a driving mechanism 50 which is mounted to the piston 40, and which displaces the piston 40 within the chamber 30 according to an infusion cycle. The driving mechanism 50 drives the piston 40 upward and downward within the chamber 30 throughout the stages of the infusion cycle, as described further below, thereby allowing the mixture to agitate and to be filtered, so as to form the beverage.

Figure 3:
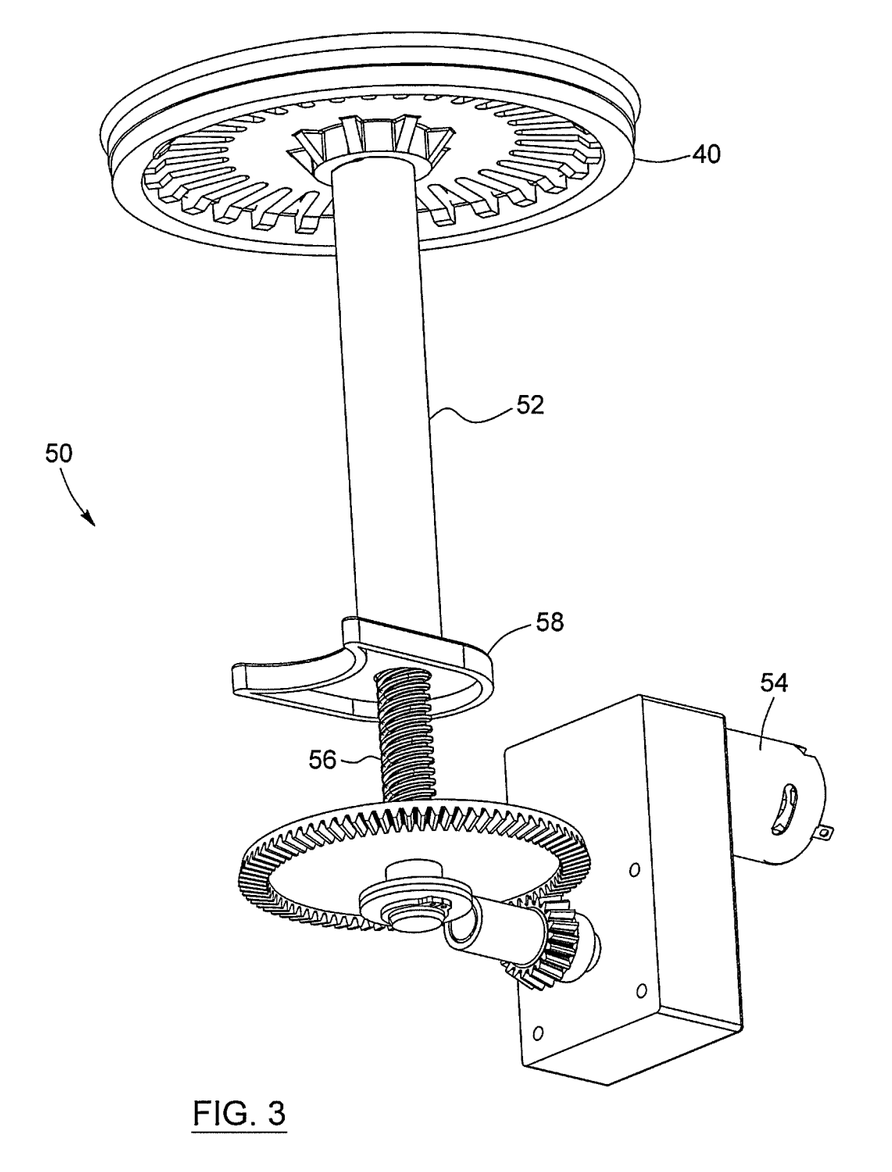
FIG. 3 is a perspective view of a driving mechanism, according to one embodiment.

One example of a driving mechanism 50 is provided in FIG. 3. In this embodiment, the driving mechanism 50 includes a piston rod 52 which is mounted to the piston 40. The piston rod 52 may be embodied by any mechanical component actuating the piston 40, thereby allowing it to be displaced vertically. In the illustrated embodiment the piston rod 52 is itself actuated by a drive motor 54, which provides the motive force required to move the piston rod 52. Some examples of drive motors 54 include suitable AC and DC motors. The cooperation of the piston rod 52 and the drive motor 54 can take many different forms. In one possible example (not shown), the piston rod 52 is mounted to a rotating cam, where the rotation of the cam allows the piston rod 52 to move upwards and downwards according to the cycle of the cam's rotation. The cam itself can be driven by the drive motor 54. In another possible embodiment, and as exemplified in FIG. 3, the piston rod 52 is mounted to a rotatable drive screw 56, which is driven by the drive motor 54. As the drive motor 54 rotates the drive screw 56, the piston rod 52, and thus the piston 40 attached thereto, can be raised or lowered depending on the direction of rotation of the drive screw 56. Of course, other or additional mechanical components or devices such as shafts, screws, gears and the like may be used to transfer movement between the piston 40, piston rod 52 and motor 54 and many other configurations of the driving mechanism 50 are possible.

In some embodiments, the driving mechanism 50 may also have a trigger device 58 mounted about the piston rod 52 so as to be raised and lowered with the vertical displacement of the piston rod 52. In the illustrated embodiment, the raising of the trigger device 58 triggers the dispensing mechanism, thereby causing the release of the beverage from the chamber. The trigger device 58 can thus be any suitable mechanism which activates, causes, brings about, or generates the release of the beverage from the chamber. Some examples of a trigger device 58, as well as its operation, are described below.

Figure 2:
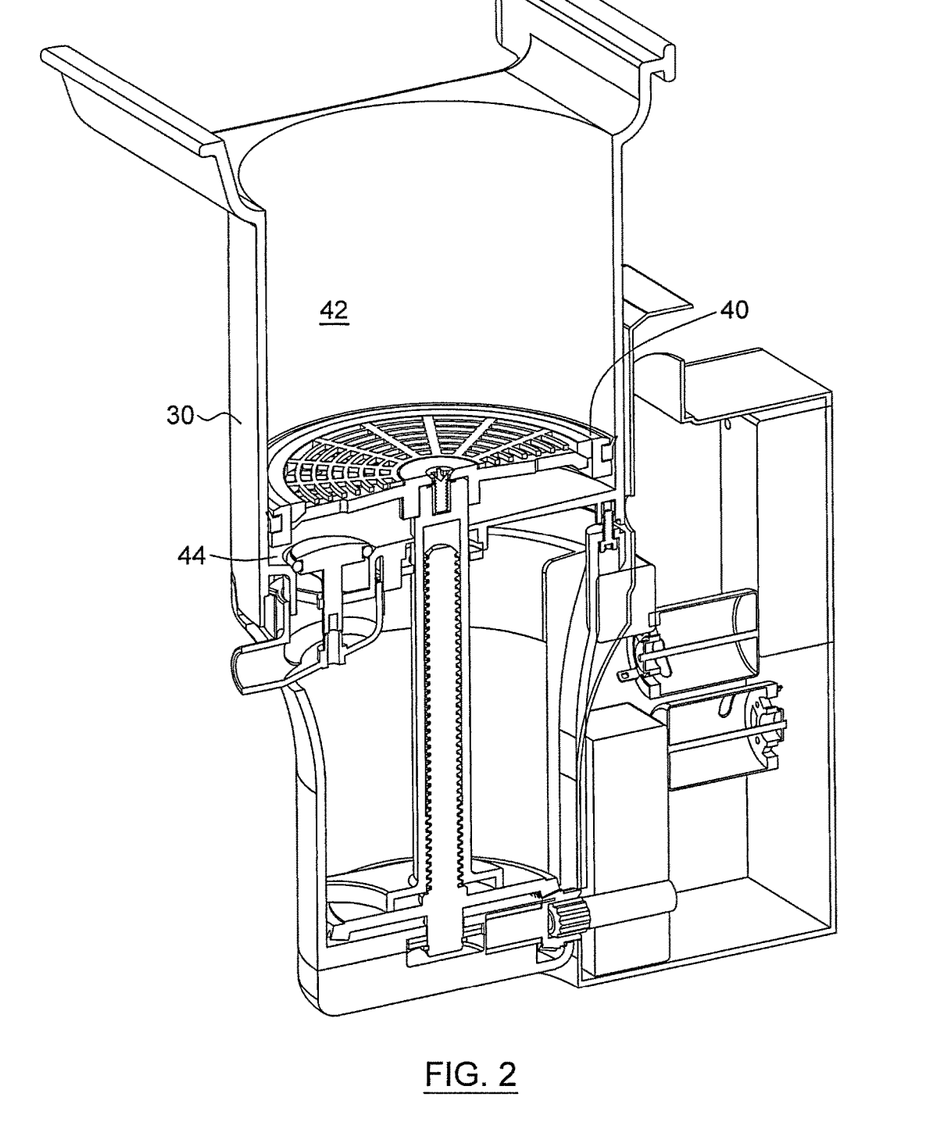
FIG. 2 is a perspective cut-away view of the brewer system of FIG. 1, a piston being shown at a bottom of a chamber.

Referring to FIGS. 1 and 2, the driving mechanism 50 displaces the piston 40 within the chamber 30 according to an infusion cycle. The infusion cycle is the process by which the mixture is made into a beverage. Other functions of the system 20 can also coincide with the infusion cycle. For example, the release of the beverage from the system 20 can be configured to match with the movement of the piston 40 according to the infusion cycle. In yet another example, the wiping of spent solid particles can be timed to begin when the piston 40 reaches a certain point in the infusion cycle. As such, the infusion cycle can be various alternation, circuit, loop, periodicity, etc. which governs the movement of the piston 40 within the chamber 30 so as to allow the mixture to be made into a beverage, among other possible outcomes.

Referring to FIG. 1, the infusion cycle first involves displacing the piston 40 downward within the chamber 30. Before the infusion cycle begins, the piston 40 can be at an initial position where it receives a suitable initial quantity of liquid and solid particles, while still being able to be downwardly displaced. One example of such a position is mid-height in the chamber 30, or just above mid-height. The liquid and solid particles may be introduced in the upper portion 42 prior to the downward displacement of the piston 40, for example while the piston is held in this initial position, or simultaneously while it is being downwardly displaced, at least partially. As the piston 40 is displaced downward, air from the sealed lower portion 44 of the chamber is forced from below the piston 40 through the filter 46, and into the mixture of liquid and solid particles, which is in the upper portion 42. The mixture is thus agitated by the incoming air, thereby helping the liquid to better infuse with the flavour or quality of the solid particles.

Referring now to FIG. 2, once at or near the bottom of the chamber 30, the piston 40 is then displaced upward within the chamber 30. This upward displacement draws the agitated mixture from the upper portion 42 and through the filter 46. This drawing action allows the infused liquid to be separated from the spent solid particles, and the infused liquid, now forming the beverage, collects below piston 40 in the lower portion 44, while the spent particles remain above the filter 46. The infusion cycle may be repeated as much as is desired, and can also be varied. For example, the course of the vertical displacement of the piston 40 can be limited or extended, or its displacement speed varied, so as to shorten or lengthen infusion times. In yet another example, the infusion cycle may include a pause period, for example between the downward and upward movement of the piston 40, so as to allow the liquid to infuse with the flavour or quality of the solid particles before the drawing action.

Referring to FIG. 1, and in some optional embodiments, it may be desirable to regulate the pressure within the lower portion 44. For example, after the piston 40 is displaced upward near the end of the infusion cycle and the beverage is emptied from the lower portion 44 to a beverage container, the pressure within the lower portion 44 will be equal to atmospheric pressure. It may thus be desirable to raise or lower the pressure within the lower portion 44. One example involving such pressure regulation includes the depressurization of the lower portion 44 prior to emptying the beverage so as to dispense the beverage quicker. Such depressurization can be achieved with an air pump 22, or with a vent, vacuum or valve. In another example of pressure regulation, the pressure within the lower portion 44 can be increased with the air pump 22 so as to provide additional agitation to the mixture when the piston 40 is displaced downward during the first part of the infusion cycle. The air pump 22 can also be used to heat the chamber 30.

The brewer system 20 also has a dispensing mechanism 60, an example of which is provided in FIG. 1. The dispensing mechanism 60 is mounted about the outlet 34 of the chamber 30, which permits the dispensing mechanism 60 to allow, or prevent, the release of the beverage out of the lower portion 44 of the chamber 30, and thus out of the system 20. In most embodiments, the dispensing mechanism 60 will release the mixture only once it has been made into a beverage suitable for consumption. The operation of the dispensing mechanism 60 may be governed by the infusion cycle, such that the vertical displacement of the piston 40 determines when and how the beverage will be dispensed from the system 20. In other variants the dispensing mechanism may be triggered by other devices external to the displacement of the piston 40.

Figure 4:
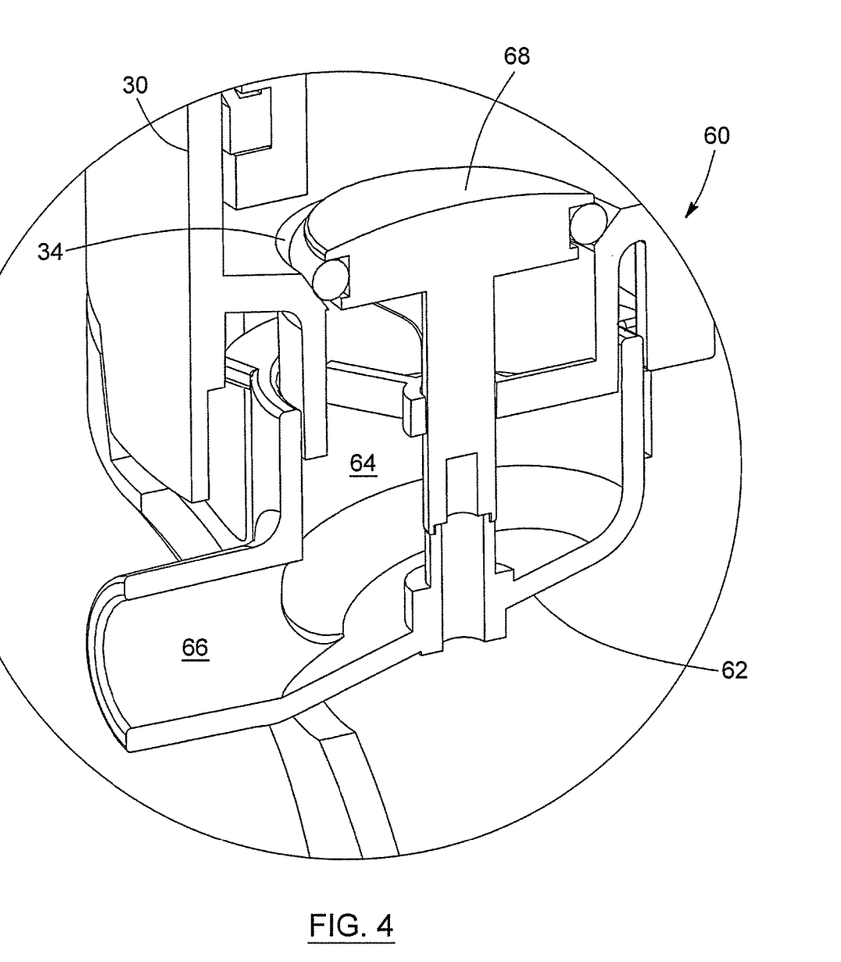
FIG. 4 is an enlarged view of a dispensing mechanism of the brewer system of FIG. 1.

One possible example of a dispensing mechanism 60 is shown in FIG. 4. In this embodiment, the dispensing mechanism 60 includes a spout 62 which is in fluid connection with the outlet 34 of the chamber 30. The expression "fluid connection" is understood to mean that the spout 62 receives fluids, such as the beverage, from the outlet 34, and is thus suitably connected to the outlet 34. The spout 62 can take any suitable shape, and can be of any suitable size. In the embodiment shown in FIG. 4, the spout 62 is substantially "L"-shaped, such that the beverage entering the spout 62 from the outlet 34 will be turned substantially 90 degrees before exiting the spout 62. Of course, the spout 62 is not limited to this particular configuration. The spout 62 includes an intake 64 which receives the beverage from the outlet 34. The intake 64 conveys the beverage to an outtake 66 of the spout 62, from which the beverage can be directed out of the system.

The dispensing mechanism 60 can also include a plug 68, which acts as a stop to the flow of the beverage from the chamber 30 to the spout 62. The plug 68 can be alternatingly affixed to, and removed from, the intake 64 of the spout 62. The plug 68 can also be mounted directly to the outlet 34 of the chamber 30. The plug 68 may operate through two positions, the open position and the closed position. In the open position, the plug 68 is raised from its contact with the intake 64 and/or outlet 34, which allows the beverage into the spout 62, and thus allows the beverage to leave the system 20. In the closed position, the plug 68 is in sealed contact with the intake 64 and/or outlet 34, thus preventing the beverage from entering the spout 62 and allowing the beverage to collect in the lower portion 44 of the chamber 30.

Figure 5A:
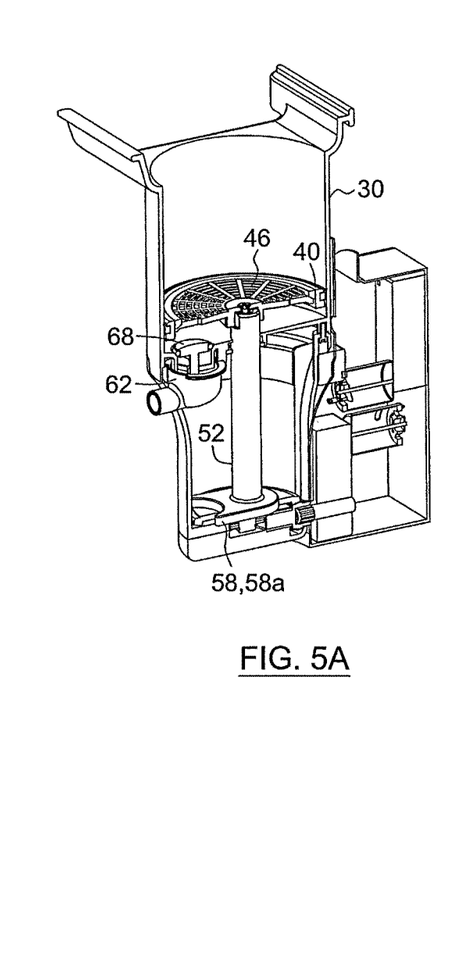
FIGS. 5A to 5C are partial cut-away perspective views of a trigger device triggering a dispensing mechanism, according to one embodiment.
Figure 5B:
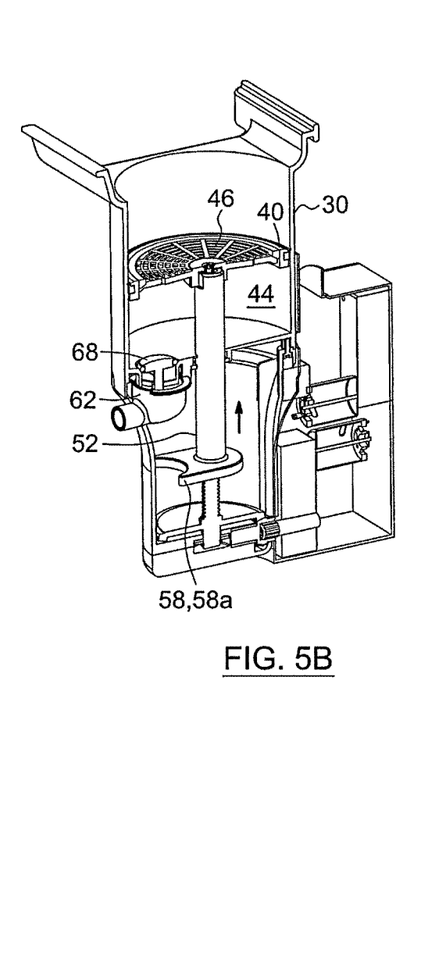
Figure 5C:
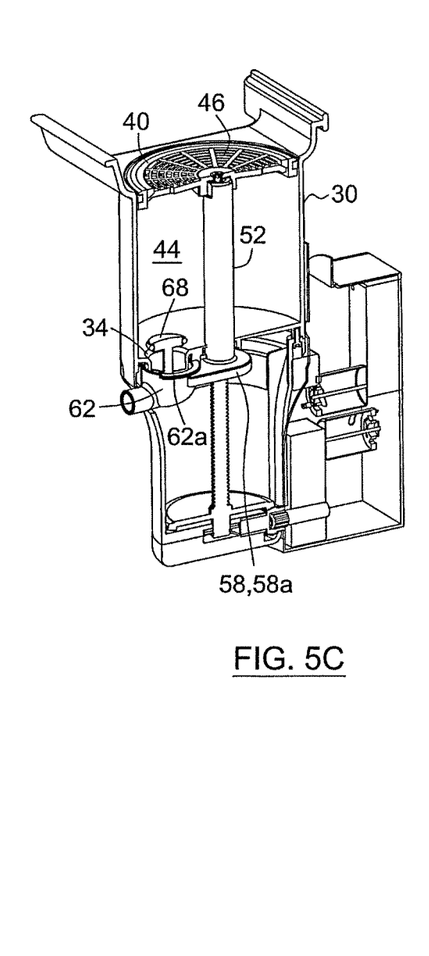

The transition of the plug 68 from the closed to open positions is preferably achieved by the vertical displacement of the trigger device 58. An example of such a displacement is provided in FIGS. 5A to 5C. The trigger device 58 is shown as a collar 58a, which can be mounted about the piston rod 52 so as to be vertically displaced along with it. As the piston rod 52 and the piston 40 are displaced vertically upward within the chamber 30 in the direction of the arrow indicated in FIG. 5B, thus drawing the mixture through the filter 46 and separating it from the spent solid particles which remain above the filter 46, the collar 58a is vertically displaced upward as well. Once the piston 40 reaches a certain trigger height, and as shown in FIG. 5C, the collar 58a abuts against the spout 62 from underneath. In the example provided in FIG. 5C, the collar 58a abuts against a rim 62a of the spout 62, thus raising the spout 62. As the spout 62 is raised, the plug 68 is raised along with it from the floor of the chamber 30, thus placing the plug 68 in the open position. The trigger height may be any suitable height of the piston 40 within the chamber 30 which triggers the transition of the plug 68 from the closed to the open position. One example of the trigger height can include the height of the piston 40 once it has reached the top of the chamber 30 (i.e. the end of the piston's 40 stroke). Once the collar 58a abuts against the spout 62 from underneath, the plug 68 is pushed upward into the lower portion 44 of the chamber 30, which corresponds to the open position. This creates an opening in the outlet 34 through which the beverage can exit the chamber 30 and flow into the spout 60. Once the piston 40 begins to vertically descend, the collar 58a no longer abuts against the spout 62, and the plug 68 can return to the closed position, thus preventing the beverage from leaving the chamber 30.

Figure 6:
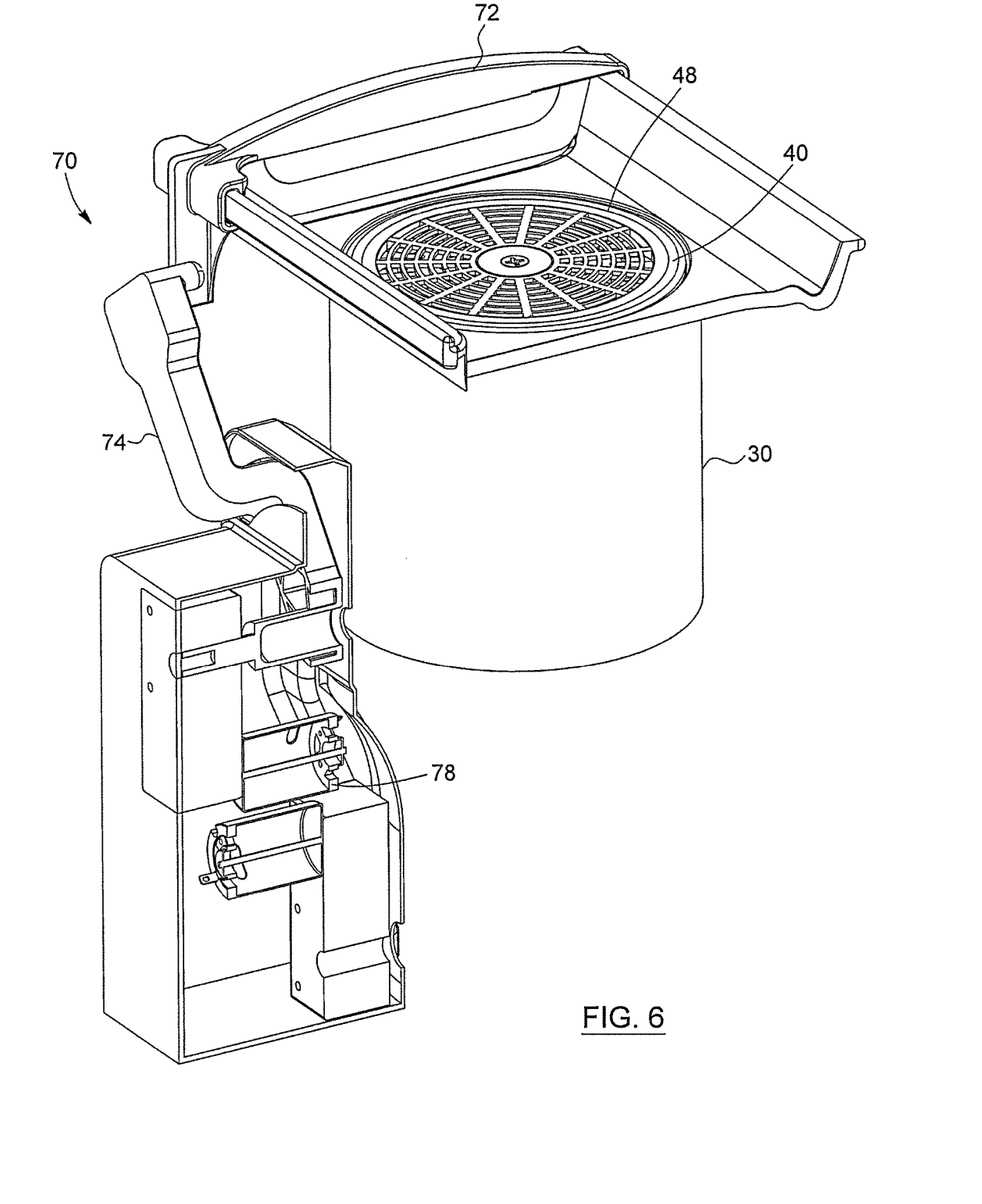
FIG. 6 is a perspective view of a wiping mechanism, according to one embodiment.
Figure 7A:
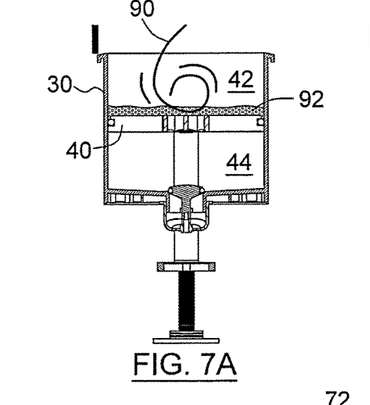
FIGS. 7A to 7I are cut-away views of the interior of a brewer system showing various stages of a method for making a beverage, according to another embodiment.
Figure 7B:
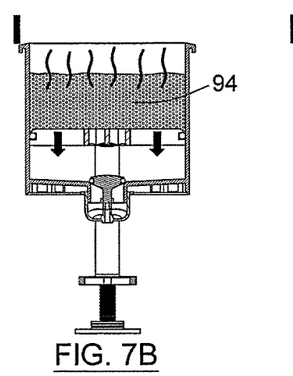
Figure 7C:
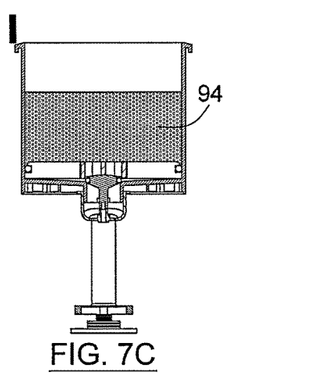
Figure 7D:
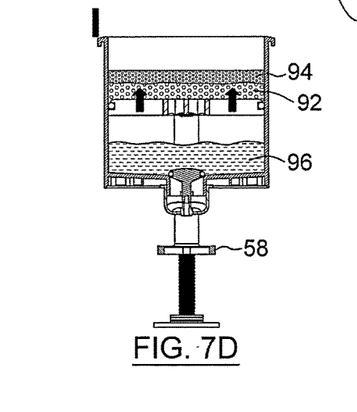
Figures 7E, 7F:
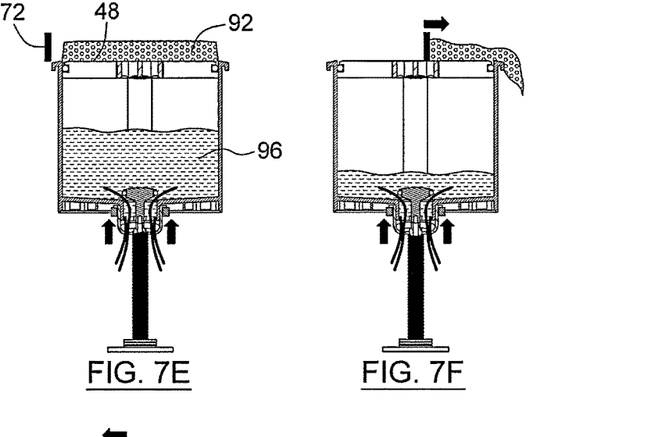
Figure 7G:
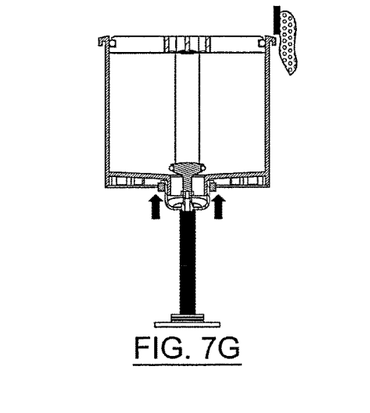
Figure 7H:
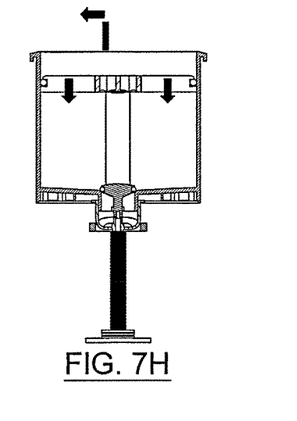
Figure 7I:
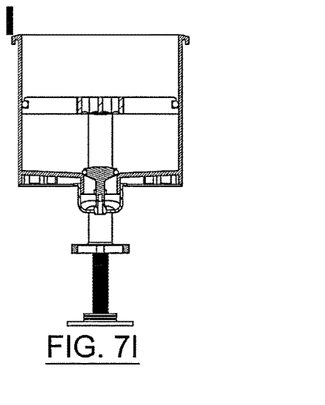
Figure 8A:
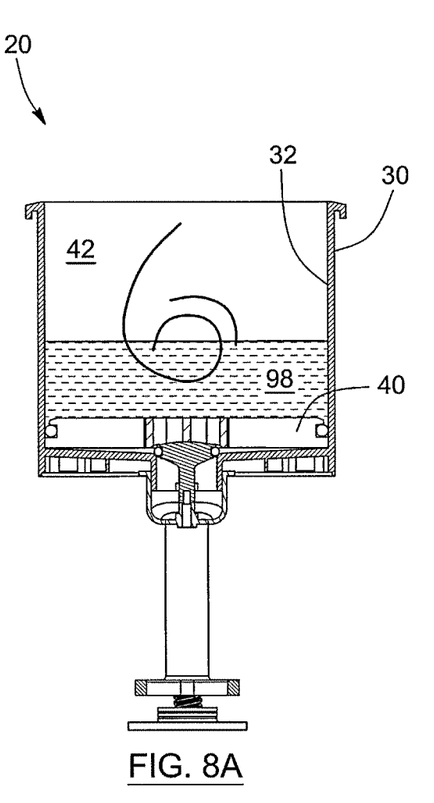
FIGS. 8A to 8C are cut-away views of the interior of a brewer system showing a movement of a piston and a cleaning fluid, according to another embodiment.
Figure 8B:
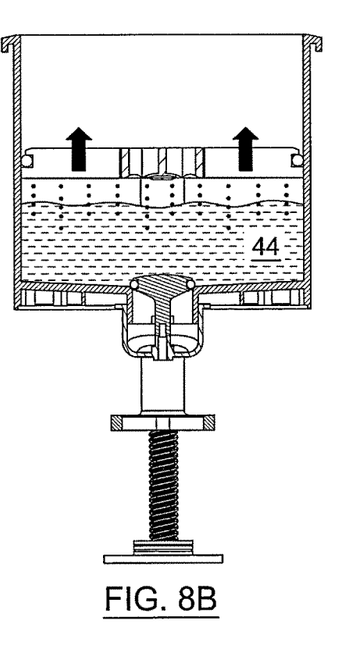
Figure 8C:
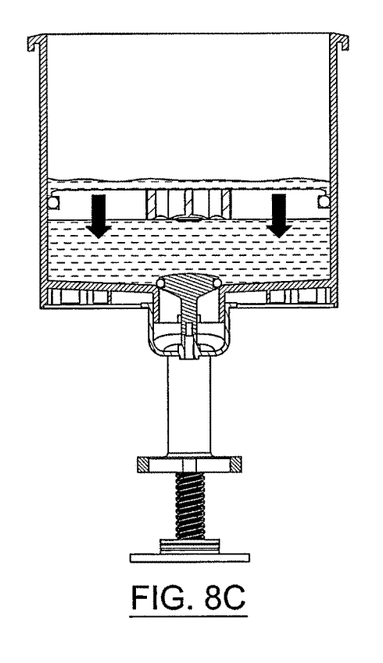

In some possible embodiments, the brewer system includes a wiping mechanism for wiping the spent solid particles from a top surface of the piston. FIG. 6 provides one example of such a wiping mechanism 70.

Once the piston 40 has been vertically displaced to the top of the chamber 30, the spent solid particles which infused the liquid with their flavour or quality are no longer useful and thus can be disposed of. These spent solid particles may collect on a top surface 48 of the piston 40 or adjacent thereto. The wiping mechanism 70 disposes of these spent solid particles by wiping them from the top surface 48 and into a suitable collector for disposal (not shown). The wiping mechanism 70 may operate independently from, or along with, the infusion cycle, that is, with the movement of the piston. Other control schemes for the wiping mechanism 70 may however be devised without departing from the scope of the invention. In one possible configuration, the wiping mechanism 70 is activated immediately upon the piston 40 reaching the top of the chamber 30. Alternatively, the wiping mechanism 70 can wipe the top surface 48 at any moment during the infusion cycle after the beverage has been extracted from the top portion.

In some embodiments, the wiping mechanism 70 includes a wiper 72 which wipes the spent solid particles from the top surface 48. The wiper 72 can be moved along any suitable guiding mechanism, such as guide rails, so as to be able to pass over the top surface 48 and to return to its initial position, as many times as is necessary. The wiper 72 can also wipe the areas of the chamber 30 adjacent to the top surface 48. The wiper 72 is in contact with the top surface 48, and the force of such contact can be fixed initially and be adjusted after a certain number of uses.

The wiper 72 can be driven by a wiper arm 74, which is connected thereto. The wiper arm 74 displaces the wiper 72 along a first direction and a second direction. In the first direction, the wiper 72 wipes the spent solid particles from the top surface 48, and in the second direction, the wiper 72 returns to its initial position. Upon returning, the wiper 72 may also wipe any remaining spent solid particles that were not wiped during the passage of the wiper 72 in the first direction. When being displaced in either the first or second directions, the wiper 72 can dispense of the spent solid particles into a waste receptacle. Alternatively, the piston 40 can be lowered below the top of the chamber 30 so that the return of the wiper 72 does not soil the top surface 48 of the piston 40. The wiper arm 74 can be driven by a wiper motor 76, which can be any suitable electric motor. The wiper motor 76 moves the wiper arm 74 between the first and second directions. It is understood that wiper 72 can be displaced from any initial position so as to travel in either the first or second direction.

It is to be noted that various components of the system as described above are preferably made of substantially hardened materials, such as metals, alloys, polymers, composite materials, and/or the like, depending on the particular applications for which the system is intended for, and the different parameters in cause (temperature of liquids, corrosion, filter clogging, dimensions, etc.).

According to another embodiment of the present invention, there is provided a method for making a beverage from a mixture of liquid and infusible solid particles. The steps of method will now be described with reference to the accompanying figures. Some of the steps of the method may correspond to the brewer system's infusion cycle. In most embodiments of the method, the chamber is a sealed system, and the piston is a means by which the pressure within the upper and lower portions of the chamber can be equalized. Indeed, the making of the beverage results from the pressure fluctuations created in the chamber by the movement of the piston.

FIG. 9A provides an example of step a) of the method, where the liquid 90 and solid particles 92 are introduced into the upper portion 42 of the chamber 30, thereby forming the mixture. The liquid 90 and the solid particles 92 can be added in any particular order. In some embodiments, the liquid 90 and solid particles 92 may be mixed to form the mixture 94 before being added to the chamber 30. The liquid 90 and solid particles 92 collect in the upper portion 42 because the filter of the piston 40 is not permeable to the solid particles, and may only be permeable to the liquid 90 under pressure. Thus, step a) allows for the liquid 90 and solid particles 92 to form a mixture. The initial position of the piston 40 can be at any suitable height, and is preferably high enough within the chamber so that sufficient agitation can be caused by the downward displacement of the piston 40, and high enough so that the introduction of the liquid and agitation of the mixture does not cause substantial splashing/spills from the top of the chamber 30.

FIGS. 9B and 9C provide examples of step b) of the method, where the piston 40 is displaced downward within the chamber 30. This downward displacement of the piston 40 reduces the volume of the lower portion 44, which in a sealed system, results in the gaseous pressure of the lower portion 44 increasing such that it is greater than the pressure in the upper portion 42. This pressurized gas (i.e. air) seeks release, and finds it by leaving the lower portion 44 through the filter of the piston 40 and into the upper portion 42. As the air is forced into the upper portion 42, it passes through the mixture 94, thereby causing turbulence, and thus agitating the mixture 94. This agitation can continue until the piston 40 has reached a bottom of the chamber 30, as exemplified in FIG. 9C, at which point relatively little air can be forced from the lower portion 44 to the upper portion 42. The piston 40 can pause at this point for an appropriate infusing period, for example a few seconds, so as to allow the agitated mixture to further infuse.

In some possible embodiments, steps a) and b) of the method are performed concurrently, that is, at the same time. As the piston 40 moves downward, the volume of the upper portion 42 increases, which advantageously allows more liquid 90 and/or solid particles 92 to be added to the upper portion 42. Thus, the chamber 30 is able to hold more mixture 94, and ultimately, produce more beverage, during a single infusion cycle.

FIG. 9D provides an example of step c) of the method, where the piston 40 is displaced upwardly within the chamber 30 so as to draw the beverage 96 from the upper portion 42 into the lower portion 44. In most embodiments, the act of drawing the mixture 94 through the filter of the piston 40 results in the making of the beverage 96 because the mixture 94, once it is separated from the spent solid particles 92, consists of the infused liquid, and is thus ready for consumption. This upward displacement of the piston 40 increases the volume of the lower portion 44, which in a sealed system, results in the pressure of the lower portion 44 decreasing to a level below the pressure of the upper portion 42. The pressure differential between the upper and lower portions 42,44 acts as a force which pushes against the mixture 94 in the upper portion 42, driving it through the filter and into the lower portion 44. The filter of the piston 40 permits only the infused liquid 90 (i.e. the beverage 96) to pass through it, while the spent solid particles 92 remain above the filter.

In some embodiments, and as exemplified in FIGS. 9E to 9I, the method includes the additional step of removing the spent solid particles from above the filter when the piston 40, or the top surface 48 of the piston 40, reaches a top of the chamber 30. Alternatively, the top surface 48 can be wiped by a wiping mechanism which descends below the level of the top of the chamber 30. The wiping can be done by a wiping mechanism, such as the one described above, which can include a wiper 72 which wipes the top surface 48 of the piston 40.

In some embodiments, and as exemplified in FIGS. 9E and 9F, the method includes the additional step of dispensing the beverage 96 from the lower portion 44 and into a beverage container, for example a mug or cup (not shown). This can be achieved with a dispensing mechanism, such as the one described above, which can be triggered to release the beverage 96 once the piston 40 reaches a trigger height within the chamber 30.

In another possible embodiment, and as exemplified in FIGS. 10A to 10C, the method includes the additional step of cleaning the piston 40, filter, and the chamber 30. It is known that the build-up of residue and/or spent solid particles can affect the performance of the system. In order to address this problem, the brewing system 20 can be cleaned, and the frequency of such cleaning can vary. FIG. 10A provides an example of sub-step A) of the additional step, where a cleaning fluid 98 is introduced into the upper portion 42 of the chamber 30. The cleaning fluid 98 can be introduced by gravity, or under pressure, and cleans both the inner surface 38 of the chamber 30 and the top surface 48 of the piston 40. Furthermore, the sealed contact of the piston 40 with the inner surface 32 allows the piston 40 to sweep spent solid particles off the inner surface 32 as the piston 40 is vertically displaced. Before the cleaning fluid 98 is added, the piston 40 can be located at any suitable height within the chamber provided that the cleaning fluid 98 can be drawn through the filter of the piston 40.

FIG. 10B provides an example of sub-step B), where the piston 40 is displaced upward within the chamber 30. This upward displacement of the piston 40 draws the cleaning fluid 98 from the upper portion 42, through the filter, and into the lower portion 44. In so doing, the filter is cleaned by the cleaning fluid 98 as it passes through the filter. Furthermore, the edges of the piston 40 may be lubricated by the presence of cleaning fluid 98 on the inner surface 32 such that the displacement of the piston 40 cleans the walls of the inner surface 32, and thus the interior of the chamber 30. The piston 40 does not need to be fully upwardly displaced (i.e. does not have to complete its full stroke), and can instead be upwardly displaced only enough so that a certain volume of cleaning fluid 98 can pass through the filter. FIG. 10C provides an example of sub-step C), where the piston 40 is displaced downwardly within the chamber 30 to below a level of the cleaning fluid 98. By descending below the level of the cleaning fluid 98, the cleaning fluid 98 is forced upward from the lower portion 44 and through the filter, which provides a pressurized cleaning to the bottom surface of the piston 40 and/or filter.

The system and method for making a beverage according to described embodiments may provide advantages over other systems and methods known in the art. Advantageously, in some embodiments the movement of the piston downwardly so as to agitate the mixture increases the volume of the upper portion, thereby allowing additional solid particles and liquid to be added to the chamber and further increasing brewing capacity. This can thus allow for the removal of superimposed chambers known the in the art without compromising beverage output capacity. Further advantageously, the ability to agitate the mixture by displacing the piston downward may dampen the "volcano effect", which can occur when the agitation of the mixture causes the mixture to escape from the chamber. In agitating the mixture by driving it away from the top of the chamber, a more powerful agitation for a given chamber volume can be applied.

Furthermore, in some embodiments the drive motor can control the vertical displacement of the piston rod independently of the wiper motor controlling the movement of the wiper arm. This use of independent drive and wiper motors allows for the brewing and wiping cycles to be controlled separately from each other. Therefore, as the collar of the piston rod is pushing the plug so as to release the beverage from the chamber, the wiper motor can be moving the wiper arm and the wiper across the top surface, and both such movements can be coordinated independently of each other. Alternatively, such coordination of the beverage release and wiper can be performed alone by either the driver motor or the wiper motor. Another advantage of an independent drive motor is that the agitation and drawing actions can be accelerated, decelerated, and modulated to fit the exact infusing cycle required, while not affecting any of the other functions of the brewer system. For example, such independent control allows clockwise as well as counterclockwise rotation of the drive motor. Similarly, independent operation of the wiper motor can allow for the optimization of system parameters such as wiper positioning, speed, acceleration, deceleration, and other similar parameters.

Furthermore, the cleaning of the brewer system allows for hands-off maintenance and system upkeep. Such self-cleaning may be desirable when the system is used directly by consumers.

Of course, numerous modifications could be made to the above-described embodiments without departing from the scope of the invention.

The invention claimed is:

1. A brewer system for making and dispensing a beverage from a mixture of liquid and infusible solid particles, the system comprising:
   a chamber for receiving the liquid and the particles, the chamber being provided with an inner surface and an outlet for dispensing the beverage;
   a piston in sealed contact with the inner surface and vertically displaceable within the chamber, the piston dividing the chamber into an upper portion above the piston and a sealed lower portion below the piston, the piston comprising a filter and configured to allow fluid flow through the filter from the upper portion to the lower portion and to allow fluid flow through the filter from the lower portion to the upper portion;
   a dispensing mechanism including a plug movable between open and closed positions to open and close the outlet of the chamber, the dispensing mechanism allowing beverage to exit from the lower portion of the chamber via the outlet when the plug is in the open position, and sealing the lower portion of the chamber when the plug is in the closed position; and
   a driving mechanism configured to drive the piston within the chamber downwardly within the chamber with the plug in the closed position to force air from the sealed lower portion upwardly through the filter and into the upper portion so as to agitate the mixture, and to drive the piston upwardly within the chamber with the plug in the closed position to draw beverage from the upper portion downwardly through the filter and into the sealed lower portion while solid particles remain above the filter.

2. A brewer system according to claim 1, wherein the driving mechanism comprises:
   a piston rod mounted to the piston;
   a drive motor operatively connected to the piston rod, the drive motor vertically displacing the piston rod within the chamber; and
   a trigger device mounted to the piston rod, the trigger device being vertically displaced concurrently with the piston rod so as to move the plug between the open and closed positions.

3. A brewer system according to claim 2, wherein the piston rod is mounted about a rotatable drive screw, the drive screw being rotated by the drive motor so as to vertically displace the piston rod.

4. A brewer system according to claim 2, wherein the dispensing mechanism further comprises:
   a spout in fluid connection with the outlet of the chamber, the spout comprising an intake for receiving the beverage from the outlet and an outtake for directing the beverage out of the brewer system; and
   wherein the plug is removably mounted to the intake of the spout, the plug preventing the beverage from entering the spout when in the closed position, and the plug allowing the beverage to enter the spout when in the open position, the plug being transitioned between the open and closed positions by movement of the trigger device.

5. A brewer system according to claim 4, wherein the trigger device transitions the plug to the open position upon the trigger device being displaced vertically upward.

6. A brewer system according to claim 2, further comprising a wiping mechanism for wiping solid particles from a top surface of the piston.

7. A brewer system according to claim 6, wherein the wiping mechanism comprises:

a wiper for wiping the solid particles from the top surface;

a wiper arm connected to the wiper, the wiper arm displacing the wiper in a first direction so as to wipe the solid particles, and in an opposed second direction so as to return the wiper; and a wiper motor functionally connected to the wiper arm, the wiper motor moving the wiper arm in the first and second directions.

8. A brewer system according to claim 7, wherein the drive motor controls the vertical displacement of the piston rod independently of the wiper motor controlling the movement of the wiper arm.

\* \* \* \* \*